(12) United States Patent
Sun et al.

(10) Patent No.: US 9,258,101 B2
(45) Date of Patent: Feb. 9, 2016

(54) METHOD AND APPARATUS FOR ALLOCATING OFDM SUBCARRIERS FOR NEXT CODEWORD POINTERS OR OTHER SIGNALING MESSAGES

(71) Applicant: Futurewei Technologies, Inc., Plano, TX (US)

(72) Inventors: Fanglin Sun, Shenzhen (CN); Dao Pan, Shenzhen (CN); Jim Jeng Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 73 days.

(21) Appl. No.: 14/149,416

(22) Filed: Jan. 7, 2014

(65) Prior Publication Data

US 2015/0195076 A1 Jul. 9, 2015

(51) Int. Cl.
*H04L 5/00* (2006.01)

(52) U.S. Cl.
CPC ............ *H04L 5/0058* (2013.01); *H04L 5/0039* (2013.01); *H04L 5/0046* (2013.01)

(58) Field of Classification Search
None
See application file for complete search history.

(56) References Cited

U.S. PATENT DOCUMENTS

| | | | | |
|---|---|---|---|---|
| 7,085,306 B1* | 8/2006 | Voldman | ................ | H04B 1/175 348/E7.063 |
| 2007/0107034 A1* | 5/2007 | Gotwals | ................ | H04H 20/12 725/129 |
| 2013/0107921 A1* | 5/2013 | Prodan | .................... | H04B 1/04 375/222 |
| 2014/0079102 A1* | 3/2014 | Kliger | ................. | H04L 5/0046 375/222 |

* cited by examiner

*Primary Examiner* — Candal Elpenord

(57) ABSTRACT

An apparatus for communication. A headend supports a plurality of customer premises equipment (CPEs) in a cable service network. An NCP carrier selector selects at least one orthogonal frequency division multiplex (OFDM) subcarrier taken from a radio frequency (RF) spectrum available for broadcasting signals over the cable service network using a plurality of profiles, wherein each selected OFDM subcarrier comprises a corresponding bit loading for each supported profile that meets or exceeds a minimum number of bits used for delivering next codeword pointer (NCP) messages that is acceptable for each of a plurality of profiles used in the plurality of CPEs for receiving signals over the cable service network. A profile generator generates an NCP profile identifying one or more selected OFDM subcarriers, wherein the NCP profile indicates which OFDM subcarriers within the RF spectrum are usable to carry NCP messages, and an associated bit loading for each selected subcarrier.

20 Claims, 9 Drawing Sheets

| | Subcarrier 1 | Subcarrier 2 | Subcarrier 3 | Subcarrier 4 | Subcarrier 5 | Subcarrier 6 | Subcarrier 7 | Subcarrier 8 | Subcarrier 9 |
|---|---|---|---|---|---|---|---|---|---|
| Can NCP or Signaling Messages use this Subcarrier | NO | YES | NO | YES | YES | NO | YES | YES | NO |
| Bitload in Profile 1 for CM1 or Measured Bitload for CM1 | 4 | 5 | 2 | 6 | 4 | 8 | 7 | 8 | 3 |
| Bitload in Profile 2 for CM2 or Measured Bitload for CM2 | 2 | 5 | 5 | 6 | 4 | 0 | 8 | 8 | 6 |
| Bitload in Broadcast Profile or MIN (bitloads from all CMs) | 2 | 5 | 2 | 6 | 4 | 0 | 8 | 8 | 3 |
| NCP or Signaling Messages Bitload Threshold | NCP Modulation (4 bits) + NCP margin (1 bit) (extra margin bitloading is optional) | | | | | | | | |

FIG. 6

| Subcarrier | Subcarrier 1 | Subcarrier 2 | Subcarrier 3 | Subcarrier 4 | Subcarrier 5 | Subcarrier 6 | Subcarrier 7 | Subcarrier 8 | Subcarrier 9 |
|---|---|---|---|---|---|---|---|---|---|
| Bitloading Table for NCP defined for subcarriers (unit in bits) | 1 | 3 | 4 | 5 | 7 | 6 | 4 | 2 | 0 |
| Can NCP (in QPSK) use this subcarrier? | NO | YES | YES | YES | YES | YES | YES | YES | NO |

FIG. 7

METHOD AND APPARATUS FOR ALLOCATING OFDM SUBCARRIERS FOR NEXT CODEWORD POINTERS OR OTHER SIGNALING MESSAGES

BACKGROUND

A cable network sends downstream and upstream signals using various protocols, including Data Over Cable Service Interface Specification (DOCSIS) and EPON (Ethernet Passive Optical Network) Protocol over Coax (EPoC). For downstream channels, some of these protocols have selected to use multiple profiles to send broadcast signals over a physical coax network to accommodate for varying channel conditions. However, these profiles are defined for sending data and not for sending control signaling.

For example, DOCSIS 3.1 has selected 16 or more downstream profiles. In each of the profiles, some subcarriers are muted. It may follow that a muted subcarrier in one profile may not be muted in another profile. Every cable modem associated with a corresponding subscriber or customer must be able to receive the control signaling on a reliable basis.

However, a problem arises when signaling messages land on a muted subcarrier for a particular cable modem. In that case, for the same subcarrier, other cable modems may be able to decode the control signaling, but the cable modem having muted that subcarrier would not be able to decode the control signaling.

It would be advantageous to provide for a reliable method for delivering signaling messages.

SUMMARY

An apparatus for communication, including a headend and an NCP carrier selector. The headend is configured to support a plurality of customer premises equipment (CPEs) in a cable service network. The NCP carrier selector of the headend is configured for selecting at least one orthogonal frequency division multiplex (OFDM) subcarrier taken from a radio frequency (RF) spectrum available for broadcasting signals over the cable service network using a plurality of profiles, wherein each selected OFDM subcarrier comprises a corresponding bit loading for each supported profile that is greater than or equal to a minimum number of bits used for delivering at least one next codeword pointer (NCP) that is acceptable for each of a plurality of profiles used in the plurality of CPEs for receiving signals over the cable service network. A profile generator of the headend is configured for generating an NCP profile identifying one or more selected OFDM subcarriers, wherein in each of the selected OFDM subcarriers each supported profile has a corresponding bit loading greater than or equal to the minimum number of bits, wherein the NCP profile indicates which OFDM subcarriers within the RF spectrum are usable to carry at least one NCP message, and an associated bit loading for each selected subcarrier.

In still other embodiment, a system for communication is disclosed. The system includes a cable service network. The system also includes a headend coupled to the cable service network, wherein the headend is configured for broadcasting signals to a plurality of customer premises equipment (CPEs) over the cable service network. In particular, the signals are broadcast using a plurality of profiles comprising orthogonal frequency division multiplex (OFDM) subcarriers taken over a radio frequency (RF) spectrum. In addition, the headend is configured for selecting at least one OFDM subcarrier taken from the RF spectrum, wherein each selected OFDM subcarrier comprises a corresponding bit loading for each supported profile that is greater than or equal to a minimum number of bits used for delivering at least one next codeword pointer (NCP). Specifically, the minimum number of bits is acceptable for each of the plurality of profiles used by the plurality of CPEs for receiving signals over the cable service network. The system includes an NCP profile identifying one or more selected OFDM subcarriers, wherein in each of the selected OFDM subcarriers each supported profile has a corresponding bit loading greater than or equal to the minimum number of bits, wherein the headend is configured for generating the NCP profile, and wherein the NCP profile indicates which OFDM subcarriers within the RF spectrum are usable to carry at least one NCP message, and an associated bit loading for each selected subcarrier.

In other embodiments, a method for communication is disclosed. The method includes, at a headend of a cable service network supporting a plurality of customer premises equipment (CPEs), defining a minimum number of bits for delivering at least one next codeword pointer (NCP) that is acceptable for each of a plurality of profiles used by the plurality of CPEs for receiving signals over the cable service network. The method includes determining bit loading for a plurality of OFDM subcarriers across the plurality of profiles, wherein said OFDM subcarrier is taken from a radio frequency (RF) spectrum available for broadcasting signals over the cable service network. The method includes selecting one or more OFDM subcarriers, wherein in each of the selected OFDM subcarriers each supported profile has a corresponding bit loading greater than or equal to the minimum number of bits. The method includes generating an NCP profile indicates which OFDM subcarriers within the RF spectrum are usable to carry at least one NCP message, and an associated bit loading for each selected subcarrier.

In one embodiment, a computer system comprises a processor coupled to memory having stored therein instructions that, if executed by the computer system, cause the computer to execute a method for communication. The method includes, at a headend of a cable service network supporting a plurality of customer premises equipment (CPEs), defining a minimum number of bits for delivering at least one next codeword pointer (NCP) that is acceptable for each of a plurality of profiles used by the plurality of CPEs for receiving signals over the cable service network. The method includes determining bit loading for a plurality of OFDM subcarriers across the plurality of profiles, wherein said OFDM subcarrier is taken from a radio frequency (RF) spectrum available for broadcasting signals over the cable service network. The method includes selecting one or more OFDM subcarriers, wherein in each of the selected OFDM subcarriers each supported profile has a corresponding bit loading greater than or equal to the minimum number of bits. The method includes generating an NCP profile indicates which OFDM subcarriers within the RF spectrum are usable to carry at least one NCP message, and an associated bit loading for each selected subcarrier.

In some embodiments, an apparatus includes a tangible, non-transitory computer-readable storage medium having stored thereon, computer-executable instructions that, when executed causes the computer system to perform a method for communication. The method includes, at a headend of a cable service network supporting a plurality of customer premises equipment (CPEs), defining a minimum number of bits for delivering at least one next codeword pointer (NCP) that is acceptable for each of a plurality of profiles used by the plurality of CPEs for receiving signals over the cable service network. The method includes determining bit loading for a plurality of OFDM subcarriers across the plurality of profiles, wherein said OFDM subcarrier is taken from a radio frequency (RF) spectrum available for broadcasting signals over the cable service network. The method includes selecting one or more OFDM subcarriers, wherein in each of the selected OFDM subcarriers each supported profile has a corresponding bit loading greater than or equal to the minimum number of bits. The method includes generating an NCP profile indicates which OFDM subcarriers within the RF spectrum are usable to carry at least one NCP message, and an associated bit loading for each selected subcarrier.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

FIG. 6 is a table illustrating the allocation of OFDM subcarriers for next codeword pointers (NCPs) or other signaling messages, in accordance with one embodiment of the present disclosure.

FIG. 7 is a table illustrating results of polling a plurality of customer premises equipment (CPEs) for purposes of determining bit loading when delivering NCP messages, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for the construction of customer premises equipment (CPE) bit loading information and the use of that information when sending NCP messages through an OFDM downstream channel from a headend (e.g., DOCSIS CMTS or EPoC coax line terminal (CLT)) to the customer device, such as, a cable modem (CM), or coax network unit (CNU), or CPE.

Figure 1A:
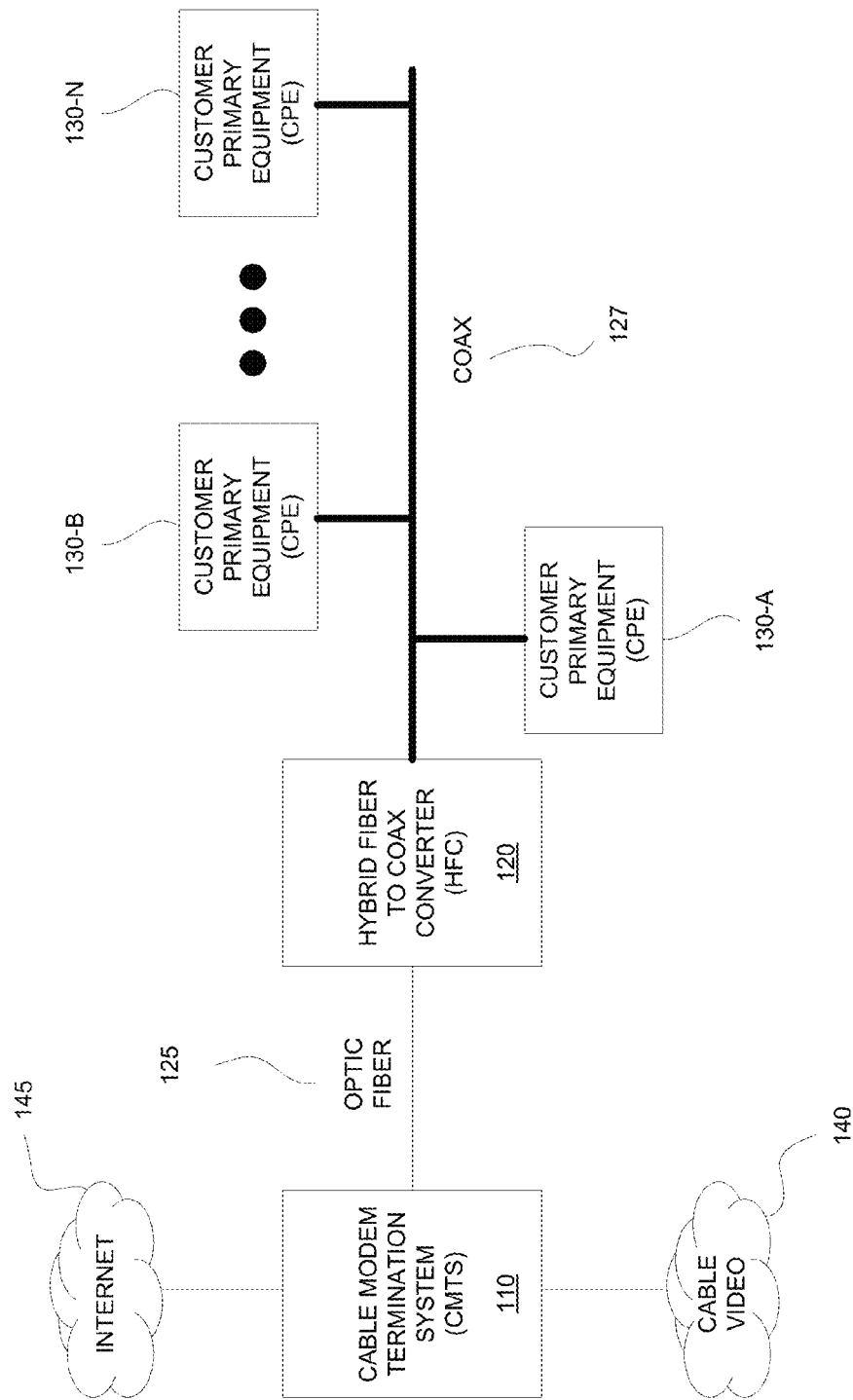
FIG. 1A is an illustration of a cable coax network supported by a DOCSIS 3.1 system architecture that is capable of allocating OFDM subcarriers for next codeword pointers (NCPs) or other signaling messages, in accordance with one embodiment of the present disclosure.

FIG. 1A is an illustration of a cable coax network 100A supported by a DOCSIS 3.1 system architecture that is capable of allocating OFDM subcarriers for next codeword pointers (NCPs) or other signaling messages, in accordance with one embodiment of the present disclosure. As shown, the coax network 100A includes a headend or cable modem termination system (CMTS) 110 at one endpoint. In one implementation, the CMTS 110 is coupled to other internet protocol (IP) networks for purposes of transmitting and/or receiving data, such as, an internet cloud network 145 or cable video network 140. In that manner, internet traffic (e.g., Ethernet) is routed to the CMTS 110 and delivers an RF modulated signal to the downstream cable subscribers.

The CMTS is operated by a cable provider and is configured to provide high speed data services (e.g., cable internet, programming, etc.) to downstream cable subscribers using RF signaling. In particular, the CMTS 110 bundles the downstream signaling onto RF carriers, and transmits an optically modified signal over a broadband optical transmitter over a fiber network 125. As shown, the CMTS 110 provides signaling over an optic fiber network 125 to a hybrid fiber to coax converter (HFC) which converts the incoming optically modified signal to an electrical RF modulated signal suitable for delivery over the coax cabling 127 connected to the downstream CPEs (e.g., CPE 130 A-N) of one or more cable subscribers. For example, the downstream RF spectrum ranges between 50 MHz at the low end to 550-1000 MHz at the upper end. Upstream traffic is also supported in an RF spectrum lower than and separate from the upstream traffic (e.g., between 0-50 MHz).

The coax cabling network 100A operates under the DOCSIS communication standard, and its derivatives, to provide high speed data transfer over existing cable networks. For instance, DOCSIS 3.1 supports and includes OFDM for communicating signals from the CMTS to the CPE of cable subscribers.

Figure 1B:
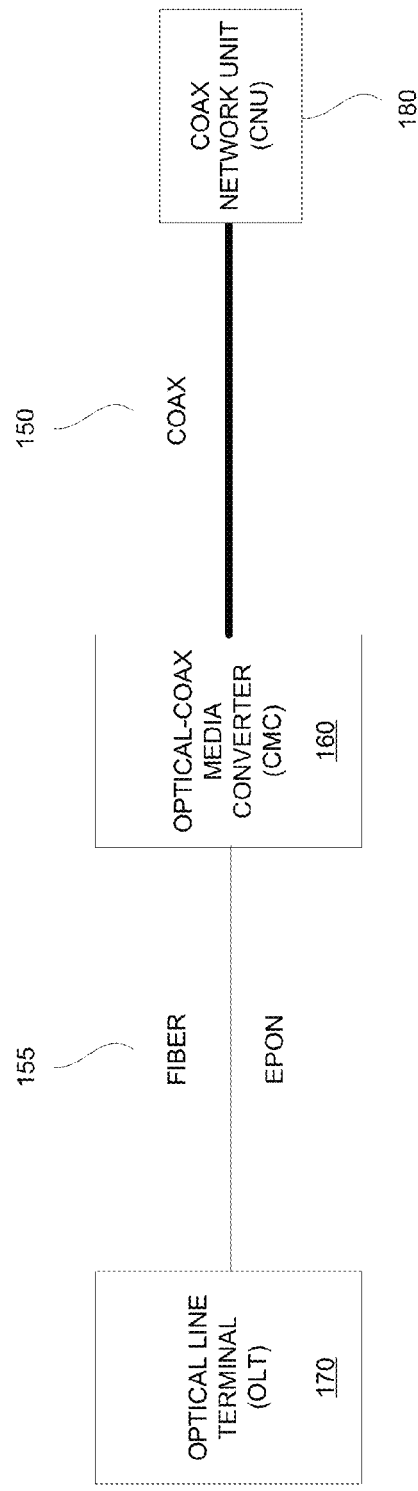
FIG. 1B is an illustration of a cable coax network supported by an Institute of Electrical and Electronics Engineering (IEEE) EPoC system architecture that is capable of allocating OFDM subcarriers for next codeword pointers or other signaling messages, in accordance with one embodiment of the present disclosure.

FIG. 1B is an illustration of a cable coax network 100B supported by an Institute of Electrical and Electronics Engineering (IEEE) EPoC system architecture that is capable of allocating OFDM subcarriers for next codeword pointers or other signaling messages, in accordance with one embodiment of the present disclosure. As shown, the coax network 100B includes a headend or optical line terminal (OLT) and/or coax line terminal (CLT) at one endpoint associated with the cable provider and a coax network unit (CNU) 180 at the endpoint associated with the cable subscriber. In addition, The OLT 170 is coupled to an optical-coax media converter (CMC) 160 through a fiber-optic network 155, wherein the CMC 160 converts the optical physical sublayer and fiber optical media signaling coming from the OLT 170 to a signal suitable for delivery over the coax cabling 150 connected to the CNU 180 of one or more cable subscribers.

The coax cabling network 100B operates under the EPoC communication standard, and its derivatives, to provide high speed data transfer over existing cable networks. EPoC provides for the extension of IEEE Ethernet PON (EPON) used at the OLT 170 over coax cabling connected to the CNUs 180. In particular, EPoC joins the media access control (MAC) and physical (PHY) sublayers at the OLT 170 with the MAC and PHY layers at the CNU 180. In embodiments of the present invention, EPoC supports and includes OFDM for communicating signals from the CMC or CLT at the OLT 170 to the CNUs 180 of cable subscribers.

Figure 2:
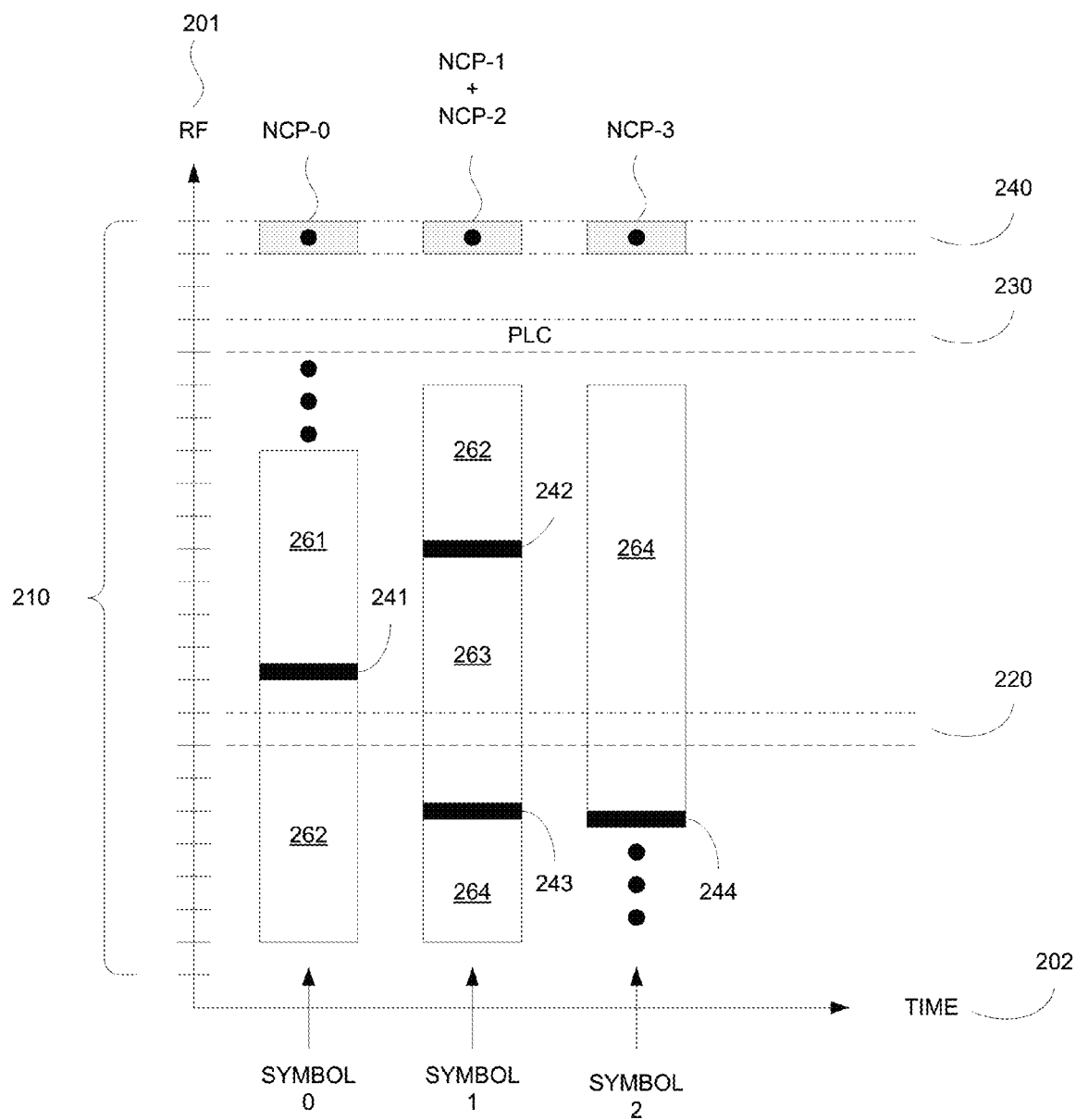
FIG. 2 is an illustration of OFDM symbols used for broadcasting signals, wherein NCPs are used to separate long codewords, and wherein one or more OFDM subcarriers are allocated for NCPs or other signaling messages, in accordance with one embodiment of the present disclosure.

FIG. 2 is an illustration of OFDM symbols used for broadcasting signals, wherein NCPs are used to separate long codewords, and wherein one or more OFDM subcarriers are allocated for NCPs or other signaling messages, in accordance with one embodiment of the present disclosure. As shown, graph 200 illustrates the frequency division along the RF axis 201 and the time division along the time axis 202. Both DOCSIS and EPoC standards have adopted OFDM as an access method for coax communications to run from CMTS to CMs using DOCSIS or from CLTs to the CNUs using EPoC within respective coax networks. OFDM multiplexes data in two dimensions: in the time dimension using symbols; and in the frequency dimension using subcarriers.

In the frequency dimension, OFDM is a multi-carrier system consisting of subcarriers which are grouped and mapped as resource blocks for coax communications. For instance, the RF spectrum 210 (e.g., 50 MHz to 1000 MHz) is defined for downstream communications. Multiple orthogonal subcarriers are combined to form an OFDM carrier broadcast signal delivered to one or more customers or subscribers. Subcarriers are defined as the spectrum between two or more demarcations along the RF axis 201. In one implementation, subcarriers have a bandwidth between 24 MHz to 192 MHz in size. Each subcarrier is independently modulated (e.g., using quadrature amplitude modulation, also referred to as QAM). For example, subcarrier 220 is shown discretely.

In addition, a PHY Link Channel (PLC) 230 is shown and used for booting CMs, timestamps, energy management, and sending other control signals. As will be described below, PLC 230 is used to deliver NCP profile information indicating which subcarrier (e.g., subcarrier 240) is used for delivering NCP signaling messages, in one embodiment.

In the time dimension, the data is further divided into symbols and/or codewords. For instance, the OFDM signals are partitioned into symbols that are separated by time, such as, symbol 0, symbol 1, and symbol 2. In addition, the OFDM signals are partitioned into codewords 261, 262, 263, and 264 across the symbols, wherein codewords comprise portions of data associated with one or more subcarriers. Codewords are defined and separated by a corresponding NCP, wherein each NCP is located with forward error correction (FEC) data. That is, the locations of the start of each codeword is provided in a corresponding NCP. For example, NCP-0 indicates the start of codeword 262, NCP-1 indicates the start of codeword 263, NCP-2 indicates the start of code word 264, etc. In one implementation, the codewords are of varying lengths, and can span across multiple symbols. For instance, code word 262 is split across two different symbols.

NCP information is delivered in the NCP channel 240, wherein the channel or subcarrier 240 is used for locating FEC codewords and assigning NCP profiles. Specifically, the plurality of NCPs is provided in a separate subcarrier 240 that is dedicated for supporting NCP messaging and/or other signaling messaging. For instance, a particular NCP points to the start of a corresponding code word.

Figure 3:
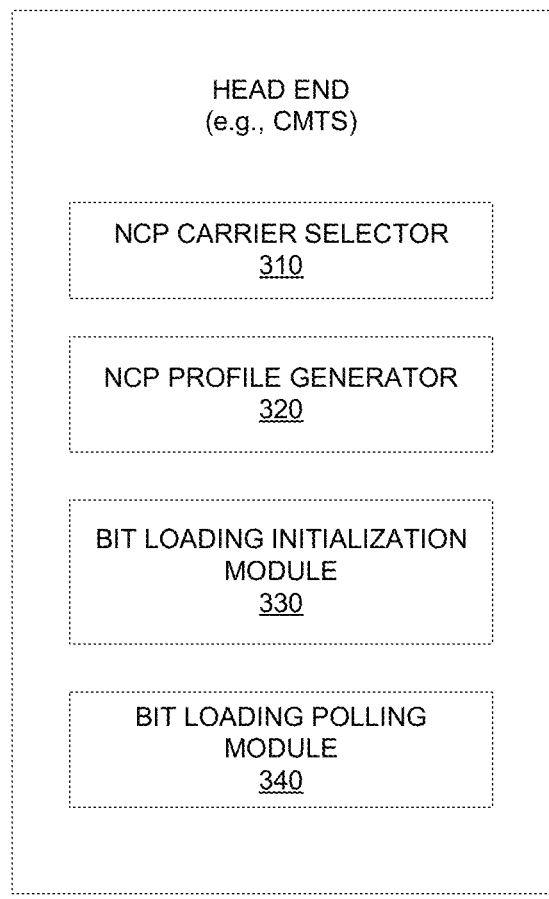
FIG. 3 is block diagram of a headend or cable modem termination system (CMTS) that is configured to allocate OFDM subcarriers for next codeword pointers (NCPs) or other signaling messages, in accordance with one embodiment of the present disclosure.

FIG. 3 is block diagram of a headend (e.g., CMTS) 300 that is configured to allocate OFDM subcarriers for next codeword pointers (NCPs) or other signaling messages, in accordance with one embodiment of the present disclosure. The headend is configured to support either DOCSIS or EPoC communication standards for purposes of supporting a plurality of CPEs (e.g., CMs, CNUs, etc.) in a cable service network.

In particular, headend includes an NCP carrier selector 310 that is configured for selecting at least one OFDM subcarrier for delivering at least one NCP. In particular, the one or more selected OFDM subcarriers are taken from an RF spectrum that is available for broadcasting signals over a cable service network using a plurality of downstream profiles. The cable service network implements profile based broadcasting, wherein each downstream profile comprises one or more available subcarriers across the RF spectrum. Also, a profile may mute one or more subcarriers. Further, in the selection of subcarriers for delivering NCP, each selected OFDM subcarrier comprises a corresponding bit loading for each supported profile that is greater than or equal to a minimum number of bits. The minimum number of bits is defined as the minimum bits needed to deliver one or more NCP data that is acceptable for each of a plurality of profiles used by the plurality of CPEs for receiving signals over the cable service network.

The headend 300 also includes a profile generator 320 that is configured for generating an NCP profile identifying one or more selected OFDM subcarriers. The selected OFDM subcarriers provide NCP messaging, and are selected on the basis that in each of the selected OFDM subcarriers each supported profile has a corresponding bit loading that is greater than or equal to the minimum number of bits necessary for delivery of NCP messaging to each of the CPEs across all the downstream profiles. In one embodiment, the selected subcarrier includes all of the plurality of profiles.

In one embodiment, the NCP profile is delivered by the headend 300 over the PLC channel to the plurality of CPEs. In another embodiment, the headend 300 delivers the NCP profile to the plurality of CPEs over an OFDM subcarrier that is dedicated in part for delivering the NCP profile and/or other signaling messaging. In that manner, each CPE knows which subcarrier to decode in order to receive NCP messaging.

The headend 300 also includes a bit loading initialization module 330 that is configured to determine bit loading of each of the plurality of CPEs upon their respective initialization process. In particular, a broadcast profile is generated for each CM or CNU at the time of network initialization. The broadcast profile contains information related to subcarrier bit loading capability. For example, at a CM or CNU, a bit loading capability is determined for each subcarrier across the RF downstream spectrum. From the bit loading information, one or more downstream profiles may be assigned to the particular CM or CNU undergoing the bit loading initialization, wherein the downstream profiles are used to deliver the broadcast signaling.

The headend 300 also includes a bit loading polling module 340 that is configured for polling each of the plurality of CPEs for NCP bit loading capabilities across a plurality of OFDM subcarriers in the RF spectrum. That is, instead of relying on initialization data collected by the headend (e.g., by the bit loading initialization module 330), the polling module 340 conducts an independent test for purposes of determining NCP bit loading across the subcarriers at each CPE.

Figure 4:
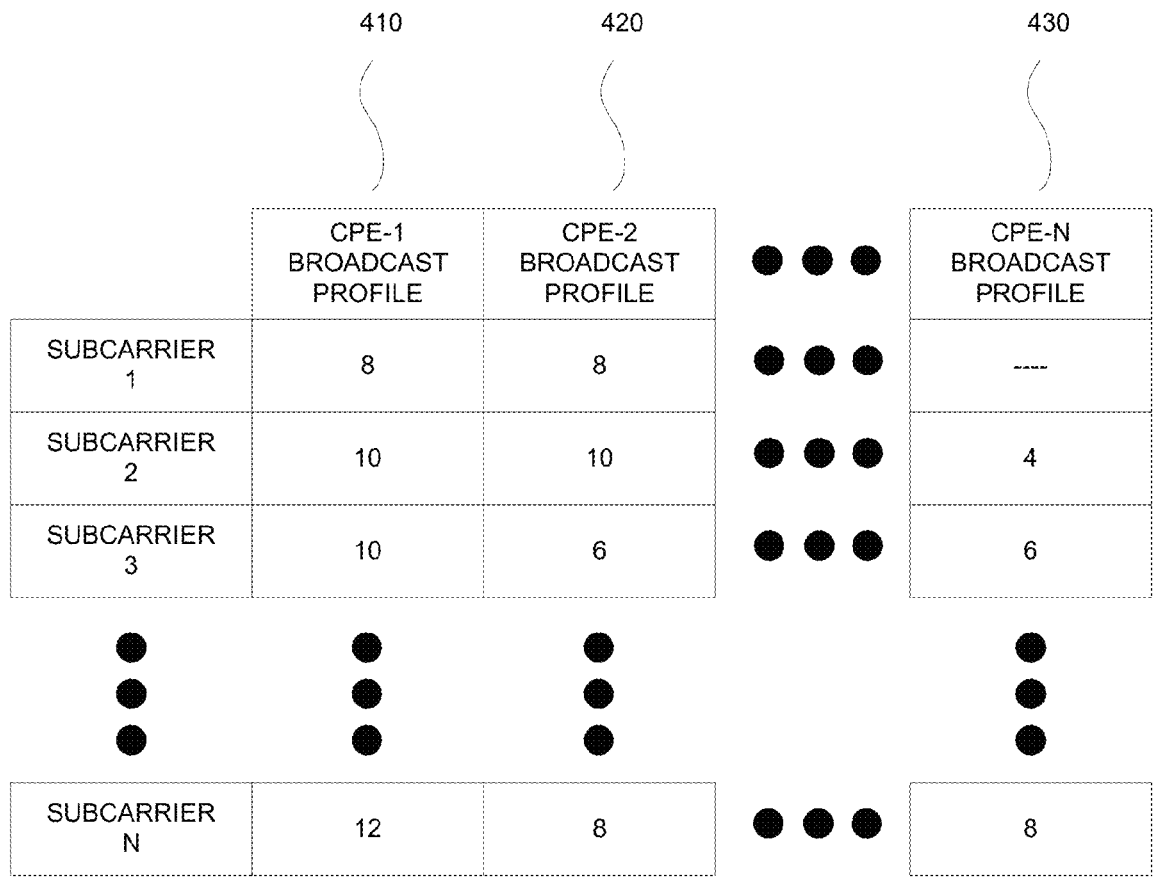
FIG. 4 is table illustrating the bit loading of one or more profiles used for broadcasting signals across a cable system network, wherein the bit loading information is used for allocating OFDM subcarriers for next codeword pointers (NCPs) or other signaling messages, in accordance with one embodiment of the present disclosure.

FIG. 4 is table 400 illustrating the broadcast profiles of one or more CPEs, in accordance with one embodiment of the present disclosure. A broadcast profile lists assigned and/or measured bit loading capabilities for supported subcarriers in a corresponding CPE. In one embodiment, the bit loading information contained in the broadcast profile for each CPE is used for allocating OFDM subcarriers for NCPs or other signaling messages.

For instance, column 410 is lists the broadcast profile for CPE-1, wherein bit loading for each supported subcarrier is provided. In particular, for CPE-1, the bit loading for subcarrier 1 is 8 bits. As such, CPE-1 is capable of receiving 8 bits (e.g., 256 QAM) over subcarrier 1. Also, for CPE-1, the bit loading for subcarrier 2 is 10 bits (e.g., 1024 QAM), the bit loading of subcarrier 3 is 10 bits, and the bit loading for subcarrier N is 12 bits (e.g., 4096 QAM). Also column 420 lists the broadcast profile for CPE-2, and column 430 lists the broadcast profile for CPE-N. In particular, for CPE-N, the bit loading for subcarrier 1 is non-existent, or incapable of receiving signaling. Also, for CPE-N, the bit loading for subcarrier 2 is 4 bits (e.g., 64 QAM), for subcarrier 3 is 6 bits, and for subcarrier N is 8 bits.

Figure 5:
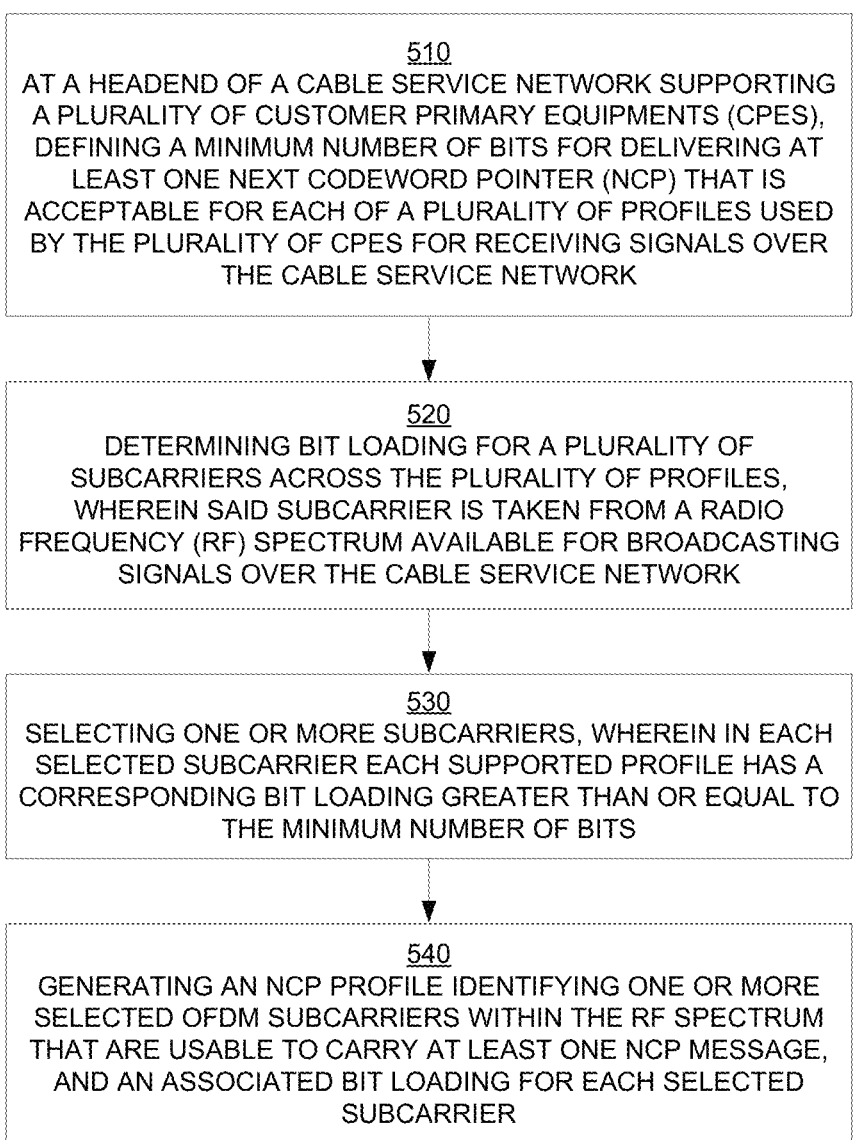
FIG. 5 is a flow diagram illustrating a method for allocating OFDM subcarriers for next codeword pointers (NCPs) or other signaling messages, in accordance with one embodiment of the present disclosure.

FIG. 5 is a flow diagram 500 illustrating a method for allocating OFDM subcarriers for NCPs or other signaling messages, in accordance with one embodiment of the present disclosure. In one embodiment, flow diagram 500 illustrates a computer implemented method for allocating OFDM subcarriers for next codeword pointers (NCPs) or other signaling messages. In another embodiment, flow diagram 500 is implemented within a computer system including a processor and memory coupled to the processor and having stored therein instructions that, if executed by the computer system causes the system to execute a method for allocating OFDM subcarriers for NCPs or other signaling messages. In still another embodiment, instructions for performing the method are stored on a non-transitory computer-readable storage medium having computer-executable instructions for causing a computer system to perform a method for allocating OFDM subcarriers for NCPs or other signaling messages as outlined by flow diagram 500. The operations of flow diagram 500 are implemented within the cable network systems 100A-B of FIGS. 1A-B and/or headend 300 of FIG. 3, in some embodiments of the present disclosure.

At 510, the method includes defining a minimum number of bits for delivering at least one NCP, at a headend of a cable service network supporting a plurality of CPEs. The minimum number of bits for NCP delivery is defined and/or acceptable for each of a plurality of downstream profiles used by the plurality of CPEs for receiving signals over the cable service network. That is, the minimum number of bits is low enough to guarantee that the CPEs can receive the NCP messaging. In one implementation, the cable service network supports the DOCSIS 3.1 communication standard or its derivatives. In another implementation, the cable service network supports the EPoC communication standard or its derivatives.

At 520, the method includes determining bit loading for a plurality of OFDM subcarriers across the plurality of profiles. Each of the OFDM subcarriers is taken from an RF spectrum that is made available for broadcasting signals over the cable service network. For instance, bit loading is provided in a broadcast profile that lists assigned and/or measured bit loading capabilities for supported subcarriers in a corresponding CPE, as is shown in FIG. 4. In one embodiment, the broadcast profile is determined upon network initialization of each CPE. In another embodiment, the broadcast profile is determined through polling each CPE to determine bit loading.

Specifically, in one embodiment, a broadcast profile in each CPE (e.g., CM or CNU) is sent at network initialization. The broadcast profile contains information indicating bit lading capabilities for each subcarrier, as previously described in relation not FIG. 4. When constructing NCP messaging or signaling messaging, the headend (e.g., CMTS) can utilize the information contained within the broadcast profile as a reference to know the bit loading information in order to determine which subcarriers should be selected for carrying NCP messaging. For example, the broadcast profile will indicate which subcarriers in the OFDM channel are muted, and which subcarriers have higher or lower bit loading capabilities on a per CPE basis. As a result, this bit loading information can be utilized by the headend (CMTS or CLT) when deciding which of the subcarriers are reliable when the headend sends downstream NCP messaging to the CPEs.

At 530, the method includes selecting at least one OFDM subcarrier, wherein in each selected subcarrier a corresponding bit loading for each supported profile is greater than or equal to the minimum number of bits. In one embodiment, each selected OFDM subcarrier supports each and/or all of the plurality of profiles. In another embodiment, two or more of the selected OFDM subcarriers supports each and/or all of the plurality of profiles.

At 540, the method includes generating an NCP profile. The NCP profile identifies the one or more selected OFDM subcarriers within the RF spectrum that are usable to carry at least one NCP message. Further, the NCP profile includes an associated bit loading for each selected subcarrier. In one embodiment, the bit loading is provided for each profile supported by the subcarrier. The NCP profile is delivered to the plurality of CPEs. In that manner, each CPE understands which selected OFDM subcarriers to look to for purposes of decoding NCP messaging. In one embodiment, the NCP profile is delivered to the plurality of CPEs over the PLC channel in the RF spectrum. In another embodiment, the NCP profile is delivered to the plurality of CPEs over a channel or subcarrier that is dedicated for delivering NCP profiles and/or other signaling messaging.

As such, the headend utilizes the bit loading information obtained in the broadcast profile to determine which subcarriers are capable of reliably sending NCP profile information or control messages within the assigned OFDM RF spectrum band. Specifically, since the headend knows or can determine the channel condition related to each CPE in the cable plane, the headend is configurable to construct the loading table or NCP profile, and send the NCP profile to the CPEs. The NCP profile indicates where the CPE should look to for NCP messaging. In one embodiment, the constructed information and/or the NCP/signaling messages are delivered via the PCL channel from the headend to the CPEs. In another embodiment, the constructed information and/or the NCP/signaling messages are delivered via a dedicated subcarrier or channel.

FIG. 6 is a Table 600 illustrating the allocation of OFDM subcarriers for NCPs or other signaling messages, in accordance with one embodiment of the present disclosure. Specifically, this table is generated in order to construct the loading profile and/or the NCP profile, which are used to notify the CPEs which subcarriers are capable of carrying NCP messaging and/or are carrying the NCP messaging. For example, row 660 indicates whether a subcarrier is capable of carrying NCP messaging. Also, row 620 includes bit loading capabilities that are either determined at network initialization or through independent measurement or polling for each subcarrier in association with CPE-1 (e.g., CM-1, as shown). Further, row 630 includes the bit loading capabilities that are either determined at network initialization or through independent measurement or polling for each subcarrier in association with CPE-2 (e.g., CM-2, as shown). In addition, row 640 includes the bit loading capabilities that are either determined at network initialization or through independent measurement or polling for each subcarrier in association with a boot profile (e.g., a boot broadcast profile) used for implementing a booting process, or the minimum bit loading across all CPEs for a corresponding subcarrier.

In Table 600, bit loading information for each subcarrier is provided in each column 611-619 on a profile-by-profile basis. In one implementation of a cable service network, 16 or more profiles are utilized to deliver broadcast signaling to the CPEs. Each CPE is assigned at least one downstream profile. In embodiments of the present invention, the NCP messaging must be delivered to each CPE so that each CPE is able to identify codewords (e.g., statistic and stop) in the symbols in order to properly decode those codewords. As such, in one embodiment, a subcarrier selected for delivery of NCP messaging must support each profile (at an acceptable and reliable bit loading rate) so that all the CPEs can receive the NCP messaging. In another embodiment, two or more subcarriers are selected for delivery of the NCP messaging, wherein the combination of subcarrier support all and each profile (at an acceptable and reliable bit loading rate).

For example, column 611 provides bit loading for subcarrier 1, column 612 provides bit loading capabilities for subcarrier 2, . . . , and column 610 provides bit loading capabilities for subcarrier 9. It is appreciated that Table 600 is for illustration purposes only, and that more or less subcarriers are supported across an RF spectrum assigned to a cable service network.

Row 650 indicates the minimum number of bits as defined for proper delivery of NCP messaging. As indicated in row 650, 4 bits are required for NCP modulation in the present example. In other embodiments, a different number of bits are required (e.g., 2 bits). In addition, an optional extra margin (also referred to as NCP margin) bit loading is provided. The extra bit load margin can be set to "0" or greater, depending on the coding gain from FEC, or other factors. If the margin is selected (e.g., 1 bit), then the minimum number of bits required for delivery of NCP messaging includes the NCP margin. In the example of Table 600, the minimum number of bits required for NCP delivery is 4 bits. If the margin is included, then the minimum number of bits required for NCP delivery is 5 bits.

As shown in Table 600, row 660 indicates whether a subcarrier is capable of carrying NCP messaging. That is, a subcarrier is capable of carrying NCP messaging when a corresponding bit loading for each supported profile is greater than or equal to the minimum number of bits (e.g., 4 without margin, and 5 with a margin). When looking at Table 600, and considering a case with no margin, subcarriers 2, 4, 5, 7, and 8 have bit loading across all profiles that meet or exceed the minimum number for bit loading (e.g., 4 bits). As such, any or all of the subcarriers 2, 4, 5, 7, and 8 can reliably deliver NCP messaging with at least the prescribed minimum number for bit loading.

NCP modulation loading requirements or construct loading information (e.g., NCP profile information) is sent via PLC or over a dedicated channel (e.g., subcarrier) from the headend to the CPEs (e.g., CMTS to CMs, or CLT to CNUs), in embodiments. Complete or partial loading information can be send from the headend to the CPE (i.e., in the implementation, some f the required bit loading information may already exist in the CPE, and therefore, not all bit loading information or NCP bit loading requirements has to be delivered form the headend to the CPEs.

FIG. 7 is a Table 700 illustrating results of polling a plurality of customer premises equipment (CPEs) for purposes of determining bit loading when delivering NCP messages, in accordance with one embodiment of the present disclosure. Specifically, Table 700 is generated to construct the minimum bit loading profile across all downstream profiles on a per subcarrier basis. This information is used to select subcarriers that are capable of carrying NCP messaging. In particular, Table 700 illustrates an NCP signaling profile which includes minimum bit loading profiles for each subcarrier (across all downstream profiles) when polling for delivery of NCP messaging. Table 700 indicates which subcarriers can be used for NCP messaging or other signaling messaging between the headend and the CPEs (e.g., between the CMTS and CM for DOCSIS 3.1; and between the CLT and CNU in EPoC).

In Table 700, a minimum number of bits is defined for proper delivery of NCP messaging. The minimum number of bits is analogous to the information listed in row 650 of Table 600, which indicates NCP modulation (minimum) and NCP margin. For purposes of illustration, a minimum number of bits is defined as 2 bits. As an example, when NCP is QPSK (2-bit), then all subcarriers are enabled with 2 or more bits. As such, the minimum number of bits for proper delivery of NCP messaging for a certain profile of a subcarrier is at least 2 bits.

As shown in Table 700, row 720 includes the minimum bit loading capabilities as determined through polling, in one embodiment. The information obtained for row 720 is also determined through network initialization, in another embodiment. The minimum bit loading information for each subcarrier is provided in each column 711-719, wherein the minimum number is determined across all supported profiles for that corresponding subcarrier. In one implementation of a cable service network, 16 or more profiles are utilized to deliver broadcast signaling to the CPEs, wherein each CPE is assigned at least one downstream profile.

As shown in Table 700, row 730 indicates whether a corresponding subcarrier is capable of carrying NCP messaging. That is, a subcarrier is capable of carrying NCP messaging when a corresponding bit loading for each supported profile is greater than or equal to the minimum number of bits. When looking at Table 700, and considering a case where the minimum number of bits is 2 bits, subcarriers 2-8 have bit loading across all profiles that meet or exceed the minimum number for bit loading. As such, any or all of the subcarriers 2-8 can reliably deliver NCP messaging with at least the prescribed minimum number for bit loading.

Figure 8:
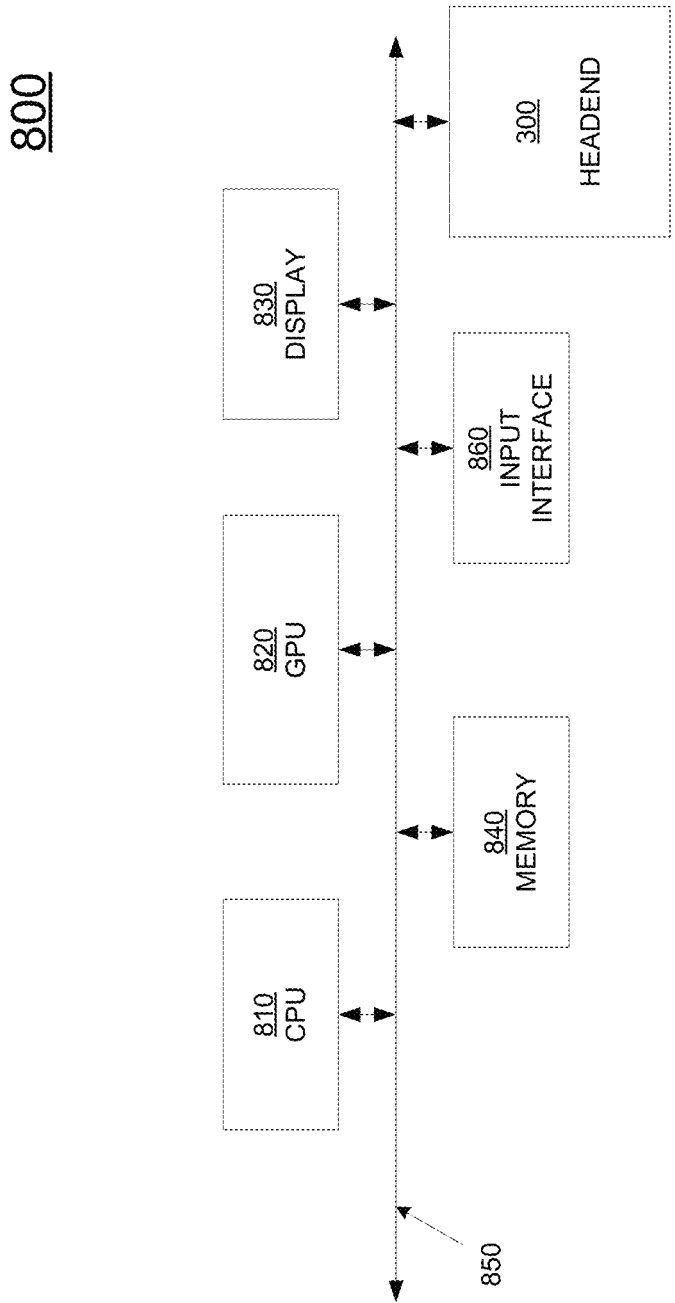
FIG. 8 depicts a block diagram of an exemplary computer system suitable for implementing the present methods in accordance with one embodiment of the present disclosure.

FIG. 8 is a block diagram of an example of a computing system 800 capable of implementing embodiments of the present disclosure. Computing system 800 broadly represents any single or multi-processor computing device or system capable of executing computer-readable instructions. Examples of computing system 800 include, without limitation, workstations, laptops, client-side terminals, servers, distributed computing systems, handheld devices, or any other computing system or device. In its most basic configuration, computing system 800 may include at least one processor 810 and a system memory 840.

Both the central processing unit (CPU) 810 and the graphics processing unit (GPU) 820 are coupled to memory 840. System memory 840 generally represents any type or form of volatile or non-volatile storage device or medium capable of storing data and/or other computer-readable instructions. Examples of system memory 840 include, without limitation, RAM, ROM, flash memory, or any other suitable memory device. In the example of FIG. 8, memory 840 is a shared memory, whereby the memory stores instructions and data for both the CPU 810 and the GPU 820. Alternatively, there may be separate memories dedicated to the CPU 810 and the GPU 820, respectively. The memory can include a frame buffer for storing pixel data drives a display screen 830.

The system 800 includes a user interface 860 that, in one implementation, includes an on-screen cursor control device. The user interface may include a keyboard, a mouse, and/or a touch screen device (a touchpad).

CPU 810 and/or GPU 820 generally represent any type or form of processing unit capable of processing data or interpreting and executing instructions. In certain embodiments, processors 810 and/or 820 may receive instructions from a software application or hardware module. These instructions may cause processors 810 and/or 820 to perform the functions of one or more of the example embodiments described and/or illustrated herein. For example, processors 810 and/or 820 may perform and/or be a means for performing, either alone or in combination with other elements, one or more of the monitoring, determining, gating, and detecting, or the like described herein. Processors 810 and/or 820 may also perform and/or be a means for performing any other steps, methods, or processes described and/or illustrated herein.

Further, system 800 includes a headend 300 that is configured for the construction of CPE bit loading information and the use of that information when sending NCP messages through an OFDM downstream channel from a headend (e.g., DOCSIS CMTS or EPoC CLT) to the customer device, such as, a CM, or coax network unit CNU, or CPE, in embodiments of the present invention.

In some embodiments, the computer-readable medium containing a computer program may be loaded into computing system 800. All or a portion of the computer program stored on the computer-readable medium may then be stored in system memory 840 and/or various portions of storage devices. When executed by processors 810 and/or 820, a computer program loaded into computing system 800 may cause processor 810 and/or 820 to perform and/or be a means for performing the functions of the example embodiments described and/or illustrated herein. Additionally or alternatively, the example embodiments described and/or illustrated herein may be implemented in firmware and/or hardware.

Embodiments of the present disclosure may be implemented by using hardware only or by using software and a necessary universal hardware platform. Based on such understandings, the technical solution of the present disclosure may be embodied in the form of a software product. The software product includes a number of instructions that enable a computer device (personal computer, server, or network device) to execute the method provided in the embodiments of the present disclosure.

Embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), USB flash disk, digital versatile disks (DVDs) or other optical storage, magnetic cassettes, magnetic tape, removable hard disk, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Thus, according to embodiments of the present disclosure, systems and methods are described for the construction of customer premises equipment bit loading information and the use of that information when sending NCP messages through an OFDM downstream channel from a headend (e.g., DOCSIS CMTS or EPoC coax line terminal) to the customer device, such as, a cable modem, or coax network unit, or customer premises equipment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. An apparatus for communication, comprising:
a headend configured to support a plurality of customer premises equipment (CPEs) in a cable service network;
a next codeword pointer (NCP) carrier selector of said headend configured to select at least one orthogonal frequency division multiplex (OFDM) subcarrier taken from a radio frequency (RF) spectrum available for broadcasting signals over said cable service network using a plurality of profiles, wherein each selected OFDM subcarrier comprises a corresponding bit loading for each supported profile that is greater than or equal to a minimum number of bits used for delivering a plurality of next codeword pointer (NCP) messages that are acceptable for each of the plurality of profiles used by said plurality of CPEs for receiving signals over said cable service network; and
a profile generator of said headend configured to generate an NCP profile identifying one or more selected OFDM subcarriers, wherein in each of said selected OFDM subcarriers each supported profile has a corresponding bit loading greater than or equal to said minimum number of bits, wherein said NCP profile indicates which of the selected OFDM subcarriers within said RF spectrum are usable to carry the plurality of NCP messages and an associated bit loading for each of said selected subcarriers.

2. The apparatus of claim 1, wherein a bit loading value for a corresponding subcarrier is determined based on the measuring output of at least one of the signal to noise ratio (SNR) or a cable plant condition.

3. The apparatus of claim 1, wherein said headend delivers said NCP profile to said plurality of CPEs over a PHY Link Control channel (PLC).

4. The apparatus of claim 1, wherein said headend delivers said NCP profile to said plurality of CPEs over an OFDM subcarrier dedicated for delivering in part said NCP profile.

5. The apparatus of claim 1, wherein each of said selected OFDM subcarriers supports said plurality of profiles.

6. A method for communication, comprising:
at a headend of a cable service network supporting a plurality of customer premises equipment (CPEs), defining a minimum number of bits for delivering a plurality of next codeword pointer (NCP) messages that are acceptable for each of a plurality of profiles used by said plurality of CPEs for receiving signals over said cable service network;
determining bit loading for a plurality of orthogonal frequency division multiplex (OFDM) subcarriers across said plurality of profiles, wherein each of said OFDM subcarriers is taken from a radio frequency (RF) spectrum available for broadcasting signals over said cable service network;
selecting one or more OFDM subcarriers, wherein in each of said selected OFDM subcarriers each supported profile has a corresponding bit loading greater than or equal to said minimum number of bits; and
generating an NCP profile identifying said one or more selected OFDM subcarriers within said RF spectrum that are usable to carry the plurality of NCP messages, and an associated bit loading for each of said selected subcarriers.

7. The method of claim 6, wherein a bit loading value for a corresponding subcarrier is determined based on the measuring output of at least one of the signal to noise ratio (SNR) or a cable plant condition.

8. The method of claim 6, wherein each of said selected OFDM subcarriers supports all of said plurality of profiles.

9. The method of claim 6, further comprising:
delivering said NCP profile to said plurality of CPEs over an OFDM subcarrier dedicated for delivering in part said NCP profile.

10. The method of claim 6, further comprising:
delivering said NCP profile to said plurality of CPEs over a PHY Link Control channel (PLC) in said RF spectrum.

11. The method of claim 6, further comprising:
delivering the plurality of NCP messages over said one or more selected OFDM subcarriers.

12. The method of claim 6, wherein said cable service network supports Data Over Cable Service Interface Specification (DOCSIS) 3.1 or its derivatives.

13. The method of claim 6, wherein said cable service network supports Ethernet passive Optical Network Protocol over Coax (EPoC).

14. The method of claim 6, wherein said determining bit loading for a plurality of OFDM subcarriers comprises:
determining at said headend bit loading upon initialization of each of said plurality of CPEs.

15. The method of claim 6, wherein said determining bit loading for the plurality of OFDM subcarriers comprises:
polling of each of said plurality of CPEs for NCP bit loading capabilities across the plurality of OFDM subcarriers in said RF spectrum.

16. The method of claim 7, wherein two or more of said selected OFDM subcarriers supports all of said plurality of profiles.

17. A system, comprising:
a communication network;
a headend comprising a processor and coupled to said communication network, the headend being configured to broadcast signals to a plurality of customer premises equipment (CPEs) over said communication network using a plurality of profiles comprising OFDM subcarriers taken over a radio frequency (RF) spectrum), and to select at least one or more OFDM subcarriers taken from said RF spectrum, wherein each of the one or more selected OFDM subcarriers comprises a corresponding bit loading for each supported profile that is greater than or equal to a minimum number of bits used for delivering a plurality of next codeword pointer (NCP) messages that are acceptable for each of a plurality of profiles used by said plurality of CPEs for receiving signals over said communication network; and
an NCP profile identifying said one or more selected OFDM subcarriers, wherein said headend is configured to generate said NCP profile, and wherein said NCP profile indicates which of said selected OFDM subcarriers within said RF spectrum are usable to carry the plurality of NCP messages and an associated bit loading for each of said selected subcarriers.

18. The system of claim 17, further comprising:
wherein a bit loading value for a corresponding subcarrier is determined based on the measuring output of at least one of the signal to noise ratio (SNR) or a cable plant condition.

19. The system of claim 17, wherein said headend delivers said NCP profile to said plurality of CPEs over a PHY Link Control channel (PLC) in said RF spectrum.

20. The system of claim 17, wherein said communication network supports Data Over Cable Service Interface Specification (DOCSIS) 3.1 or its derivatives.

\* \* \* \* \*